United States Patent
Boyd et al.

(10) Patent No.: US 12,001,099 B2
(45) Date of Patent: Jun. 4, 2024

(54) INTEGRAL MULTILAYER OPTICAL FILM

(71) Applicant: 3M INNOVATIVE PROPERTIES COMPANY, St. Paul, MN (US)

(72) Inventors: Gary T. Boyd, Woodbury, MN (US); Shu-Ching Fan, Woodbury, MN (US); Alex P. Pongratz, Minneapolis, MN (US); Gary E. Gaides, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/080,069

(22) Filed: Dec. 13, 2022

(65) Prior Publication Data

US 2023/0194926 A1    Jun. 22, 2023

Related U.S. Application Data

(60) Provisional application No. 63/265,494, filed on Dec. 16, 2021.

(51) Int. Cl.
    *G02F 1/1335*    (2006.01)
    *G02F 1/13357*   (2006.01)

(52) U.S. Cl.
    CPC .. *G02F 1/133607* (2021.01); *G02F 1/133611* (2013.01); *G02F 1/13362* (2013.01)

(58) Field of Classification Search
    CPC ......... G02F 1/133607; G02F 1/133611; G02F 1/13362; G02F 1/133603; G02F 1/133504
    See application file for complete search history.

(56) References Cited

U.S. PATENT DOCUMENTS

| | | | |
|---|---|---|---|
| 9,389,355 B2 * | 7/2016 | Boyd | G02B 6/0051 |
| 2006/0082698 A1 * | 4/2006 | Ko | G02F 1/133606 |
| | | | 349/61 |

(Continued)

FOREIGN PATENT DOCUMENTS

| | | | | |
|---|---|---|---|---|
| CN | 100470364 C | * | 3/2009 | ........... G02B 3/0031 |
| WO | WO 2010142741 | * | 12/2010 | ....... G02F 1/133528 |
| WO | WO-2010143741 A1 | * | 12/2010 | ........... G02B 6/0025 |

OTHER PUBLICATIONS

English Machine Translation of Muro, WO 2010/143,741 (Year: 2023).*
Endlish Machine Translation of Yoshida CN100470364 (Year: 2023).*

*Primary Examiner* — Donald L Raleigh
(74) *Attorney, Agent, or Firm* — Jonathan L. Tolstedt

(57) ABSTRACT

An integral multilayer optical construction includes opposing first and second structured major surfaces having two-dimensional arrays of respective first and second structures. An optical diffuser is embedded within the optical construction between the first and second structured major surfaces. The optical diffuser has an optical haze of greater than about 5% for at least one visible wavelength in a visible wavelength range extending from about 420 nm to 680 nm. When the optical construction is disposed on a light source with one of the first and second structured major surfaces facing the light source, light emitted by the light source is transmitted by the optical construction with a cross-section of an angular luminous distribution of the transmitted light in at least one first plane that includes a normal to the optical construction, including first and second intensity peaks at respective first and second angles on opposite sides of the normal.

19 Claims, 8 Drawing Sheets

(56) References Cited

U.S. PATENT DOCUMENTS

| | | | |
|---|---|---|---|
| 2007/0069978 A1* | 3/2007 | Daiku | G02F 1/13362 |
| | | | 345/8 |
| 2017/0357347 A1* | 12/2017 | Swartz | G06F 3/0445 |
| 2018/0100963 A1* | 4/2018 | Boyd | G02B 6/0055 |
| 2022/0179264 A1* | 6/2022 | Chen | G02F 1/133603 |

* cited by examiner

INTEGRAL MULTILAYER OPTICAL FILM

TECHNICAL FIELD

The present disclosure generally relates to multilayer optical films with one or more embedded diffuser films for use in backlights for display systems.

BACKGROUND

Display systems, such as liquid crystal display (LCD) systems, are used in a variety of applications and commercially available devices such as, for example, computer monitors, personal digital assistants (PDAs), mobile phones, miniature music players, and thin LCD televisions. Many LCDs include a liquid crystal panel and an extended area light source, often referred to as a backlight, for illuminating the liquid crystal panel. Backlights typically include one or more lamps and a number of light management films such as, for example, light guides, mirror films, light redirecting films (including brightness enhancement films), retarder films, light polarizing films, and diffusing films. Diffusing films are typically included to hide optical defects and improve the brightness uniformity of the light emitted by the backlight. Diffusing films can also be used in applications other than display systems.

SUMMARY

In some aspects of the present disclosure, an integral multilayer optical construction including opposing first and second structured major surfaces having substantially regular two-dimensional arrays of respective first and second structures arranged thereacross is provided. At least a first embedded optical diffuser is embedded within the optical construction between, and spaced apart from, the first and second structured major surfaces. The first embedded optical diffuser has an optical haze of greater than about 5% for at least one visible wavelength in a visible wavelength range extending from about 420 nm to about 680 nm. When the optical construction is disposed on a substantially Lambertian light source with one of the first and second structured major surfaces facing the Lambertian light source, light emitted by the Lambertian light source is transmitted by the optical construction. A cross-section of an angular luminous distribution of the transmitted light in at least one first plane that includes a normal to the optical construction includes first and second intensity peaks at respective first and second angles on opposite sides of the normal, wherein the multilayer optical construction has an integral construction.

In some other aspects of the present disclosure, a display system including a plurality of light emitting sources configured to emit light and disposed on a reflective substrate having an optical reflectance of greater about 30% at the at least one visible wavelength is provided. A display panel is disposed on the light emitting sources and is configured to receive the emitted light and form an image. A reflective polarizer is disposed between the display panel and the light emitting sources. For a substantially normally incident light and for at least the at least one visible wavelength, the reflective polarizer reflects at least 60% of the incident light having an in-plane first polarization state, and transmits at least 60% of the incident light having an orthogonal in-plane second polarization state. The integral multilayer optical construction of one or more embodiments of the present disclosure is disposed between the reflective polarizer and the light emitting sources.

In some aspects of the present disclosure, an integral multilayer optical construction including opposing first and second structured major surfaces including substantially regular two-dimensional arrays of respective first and second structures arranged thereacross is provided. First and a second optical diffusers are disposed on, and substantially conform to, the respective first and second structured major surfaces so that each of the first and second optical diffusers has a substantially constant thickness. Each of the first and second optical diffusers has an optical haze of greater than about 2% for at least one visible wavelength in a visible wavelength range extending from about 420 nm to about 680 nm. When the optical construction is disposed on a substantially Lambertian light source with one of the first and second structured major surfaces facing the Lambertian light source, light emitted by the Lambertian light source is transmitted by the optical construction. A cross-section of an angular luminous distribution of the transmitted light in at least one first plane that includes a normal to the optical construction includes first and second intensity peaks at respective first and second angles on opposite sides of the normal, wherein the multilayer optical construction has an integral construction.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Liquid Crystal Displays (LCDs) require a backlight unit as an illuminator that is efficient and uniform spatially, angularly, and spectrally. One method of illumination, utilizes a row of discrete light sources (1-D) such as LEDs, emitting into the edge of a light guide that spreads the light uniformly over the area of the display. Another method, uses LEDs arranged in a planar array (2-D) across the backlight unit. These LEDs emit directly toward the LCD panel. The 2-D arrangement allows brightness control of one or more LEDs to dynamically vary the illumination distribution in coordination with the LCD panel image. This backlighting technique is an effective means to provide a wide range of brightness for independent regions of the display, referred to as High Dynamic Range (HDR), improving the user visual experience. Backlights generally require optical films above the light source to achieve the uniformity and brightness specifications. Both methods strive to minimize total thickness of the backlight components.

The present disclosure describes configurations for two dimensional backlight units that efficiently and uniformly spread light in the plane of the backlight units.

Figure 1:
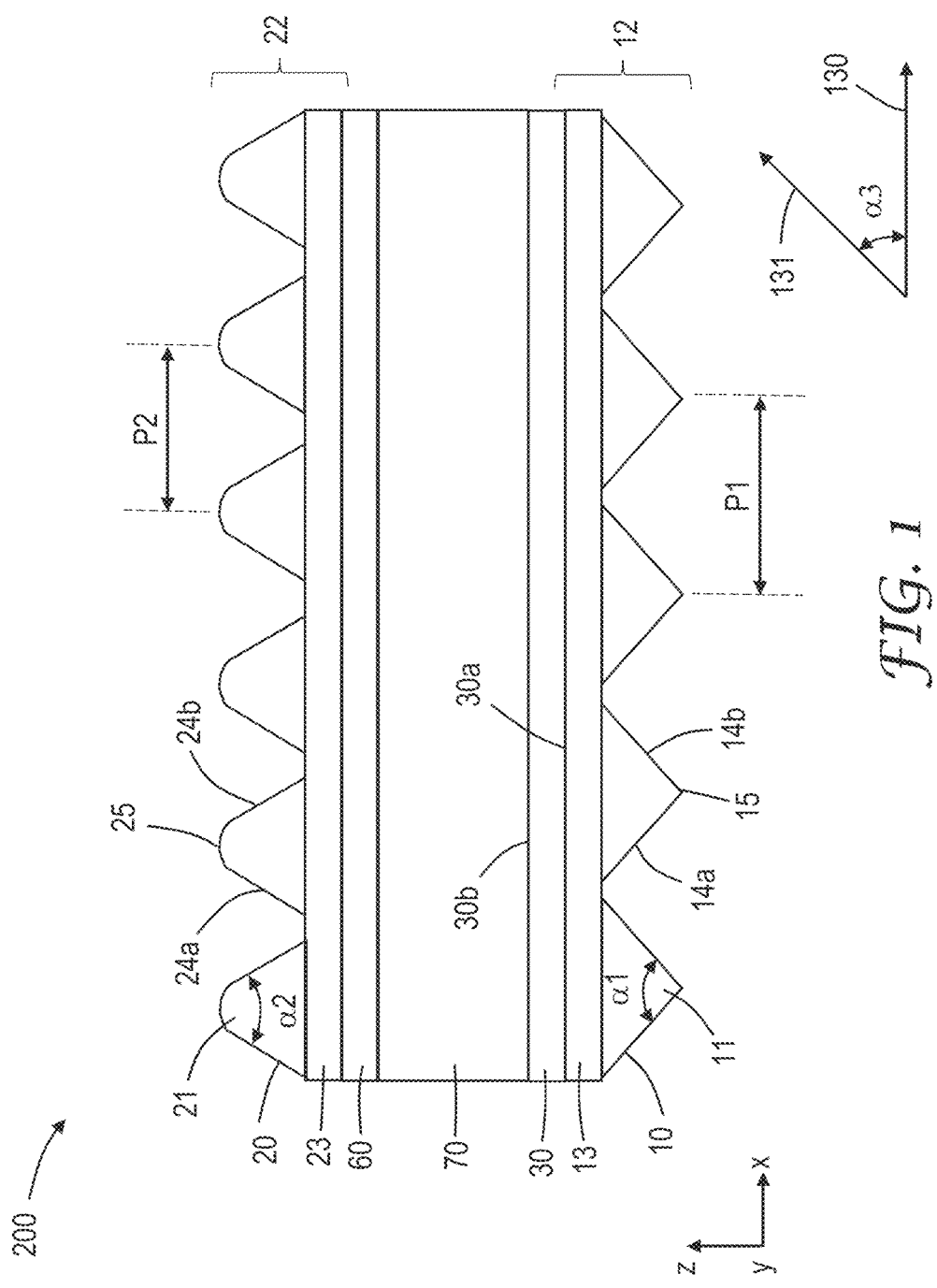
FIG. 1 is a schematic cross-sectional view of illustrative integral multilayer optical films.
Figure 2:
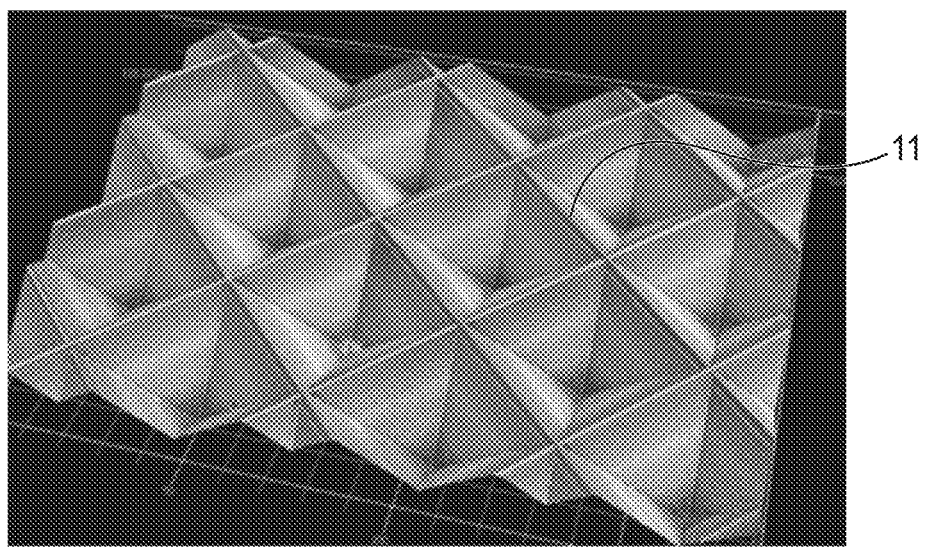
FIGS. 2-3 are top view images of structured major surfaces of an illustrative optical film.
Figure 3:
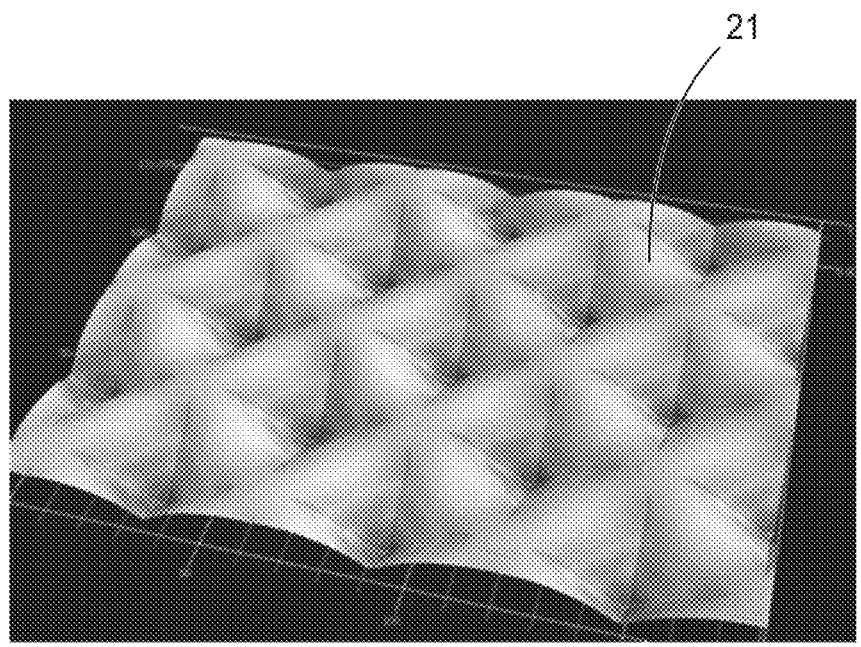

FIG. 1 is a schematic cross-sectional view of an illustrative multilayer optical film (200) according to some embodiments. In the illustrated embodiment, the optical film (200) has an integral construction and includes opposing layers (10, 20), diffuser layer (30), and a substrate layer (70). Layer (10) is a structured layer and may include a structured major surface having a substantially regular two-dimensional (x- & y-axes) array of first structures (11) arranged thereacross. The first structures (11) may be arranged along at least a first direction (x-axis) at an average pitch P1. Layer (20), arranged opposite layer (10), is a structured layer and may include a structured major surface having a substantially regular two-dimensional (x- & y-axes) array of second structures (21) arranged thereacross. The second structures (21) may be arranged along at least a second direction (x-axis) at an average pitch P2. In some aspects, P1/P2 may be chosen to at least reduce a visible moire interference. In some instances, P1/P2≤3, or P1/P2≤2.5, or P1/P2≤2. FIGS. 2-3 illustrate the top view images of the structured layers including the two-dimensional array of first (11) and second (21) structures of the optical film, respectively.

In some aspects, the structured layers (10, 20) may be symmetric or asymmetric in the film plane to achieve the desired spatial uniformity for a given LED array geometry. The shape and refractive indices of the structured layers (10, 20) may be adjusted to maximize light spreading, transmission, and recycling. Examples of shapes of first and second structured layers (10, 20) may include arrays of pyramids, prism segments, cones, and spheroids, which may be convex or concave. The concave or convex pyramids, cones or prism segments may have sharp or rounded tips of continuous or discontinuous slope. There may be a sub-structure on the structured layers of a finer scale than its macro structure. The sub-structure can facilitate light coupling in or out of the film (200). The refractive indices of one or both structured layers (10, 20) can range from 1.4 to 1.7.

In some embodiments, each of the structures in the two-dimensional array of first structures (11) may include at least two facets (14a, 14b) meeting at a peak (15) of the first structure (11). Each of the structures in the two-dimensional array of second structures (21) may include at least two facets (24a, 24b) meeting at a peak (25) of the second structure (21). The first (11) and second (21) structures include respective pluralities of first (15) and second (25) peaks. In some embodiments, the first peaks (15) may be sharper than the second peaks (25). For instance, the first structures (11) may consist of depressions with sharper edge walls as best seen in FIG. 2, while the second structures (21) may consist of depressions with rounded walls as best seen in FIG. 3.

In some embodiments, the peaks (15, 25) of the first (11) and second (21) structures respectively may have a radius of curvature. The radius of curvatures of the peaks (15) of the first structures (11) are different than the radius of curvatures of the peaks (25) of the second structures (21) by at least a factor of 2, or 5, or 10, or 20, or 50, or 100.

Each of the first (15) and second (25) peaks has an inclusion angle (α1, α2) of between about 60 degrees and about 120 degrees, or between about 70 degrees and about 110 degrees, or between about 80 degrees and about 100 degrees, or between about 85 degrees and about 95 degrees.

In some embodiments, the first structures (11) may be arranged to form parallel rows of first structures extending along a first direction (130). The second structures (21) may be arranged to form parallel rows of second structures extending along a second direction (131). The first (130) and second (131) directions may form an angle (α3) of greater than about 5 degrees and less than about 85 degrees therebetween. In some instances, the angle (α3) between the first (130) and second (131) directions may be greater than about 70 degrees and less than about 85 degrees.

The first (11) and second (21) structures of the first (10) and second (20) structured layers may be symmetric or asymmetric in the film plane to achieve the desired spatial uniformity for a given LED array geometry. The shape and refractive index of the first (11) and second (21) structures can be adjusted to maximize light spreading, transmission, and recycling.

The diffuser layer (30) may include surface diffusers, bulk diffusers, and/or embedded diffusers. The diffuser according to some embodiments in this disclosure, may be a separate layer or coating having diffusive properties with respect to visible light or a surface treatment on a layer of the optical construction of the present disclosure that provides diffusive properties to the treated surface (e.g., a surface diffuser). For example, the diffusive element may be a separate layer (e.g., a bulk diffuser) that diffuses visible light and that is either coextruded, coated, or laminated to another layer of the optical construction of the present disclosure. The diffuser layer (30) can further facilitate spreading and recycling of light.

In some embodiments, diffuser layer (30) may be embedded within the optical construction (200). In some aspects, the first optical diffuser (30) may be embedded between, and spaced apart from, the structured major surfaces of the structured layers (10, 20). In some embodiments, a second optical diffuser (60) may be embedded within the optical construction (200). In some aspects, the second optical diffuser (60) may be embedded between, and spaced apart from, the structured major surfaces of the structured layers (10, 20). The first (30) and second (60) embedded optical diffusers may be spaced apart from each other along a thickness direction (z-axis) of the optical construction (200).

The embedded diffuser layers (30, 60) may consist of a surface diffuser structure, where the refractive index above and below differ by at least 0.01 (Δn). The diffuser structure can be defined by surface height and angle distributions, and by various light scattering metrics including haze and Bidirectional Scattering Distribution Function (BSDF). The diffuser structures and Δn may be different for each of the diffuser layers (30, 60). The thickness of the diffuser layers (30, 60) can be adjusted to meet optical requirements (image spreading tends to increase with thickness of the diffuser layers to improve uniformity).

The first (30) and second (60) embedded optical diffusers may have different optical hazes. Optical haze can be defined as the % energy scattered in transmission beyond 4 degrees from a substantially normally incident collimated light beam. The optical haze may be determined according to the ASTM D1003-13 test standard. Optical haze is measured in air and can be measured using a commercially available haze meter such as BYK haze meters. In practice, the haze of the first and second optical diffusers (30, 60) may be measured individually, for example, with the optical diffuser disposed on a substrate and measured in air. In cases where the first and second optical diffusers (30, 60) are disposed on opposite sides of a substrate, one of the diffusers may be index matched in order to measure the haze of the other optical diffuser.

In some embodiments, the first embedded optical diffuser (30) may have an optical haze of greater than about 5% when measured in air for at least one visible wavelength in a visible wavelength range extending from about 420 nm to about 680 nm. In some cases, the optical haze of the first embedded optical diffuser (30) may be greater than about 10%, or 15%, or 20%, or 25%, or 30%, or 40%, or 50%, or 60%, or 70%, or 80%, or 90%, or 95% when measured in air for at least one visible wavelength in a visible wavelength range extending from about 420 nm to about 680 nm. The second embedded optical diffuser (60) may have an optical haze of greater than about 2% when measured in air for at least one visible wavelength in a visible wavelength range extending from about 420 nm to about 680 nm. In some cases, the optical haze of the second embedded optical diffuser (60) may be greater than about 5%, or 10%, or 15%, or 20%, or 25%, or 30%, or 40%, or 50%, or 60%, or 70%, or 80%, or 90%, or 95% when measured in air for at least one visible wavelength in a visible wavelength range extending from about 420 nm to about 680 nm.

Figure 9:
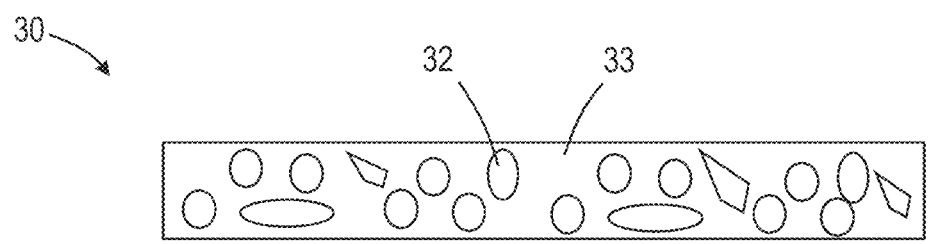
FIG. 9 is a schematic view of an optical bulk diffuser of an illustrative integral multilayer optical film.

In some embodiments, the first optical diffuser (30) may include an optical bulk diffuser such that at least a majority of light diffusion occurs in regions between opposing major surfaces (30a, 30b) of the bulk diffuser. The bulk diffuser has high haze allowing for the scattering of visible light for better uniformity. As best shown in FIG. 9, the optical bulk diffuser (30) may include a plurality of particles (32) dispersed in a host material (33). In some embodiments, bulk diffusion is accomplished by adding a diffusing agent, such as micro beads or nanoparticles to the coating or layer.

Figure 10:
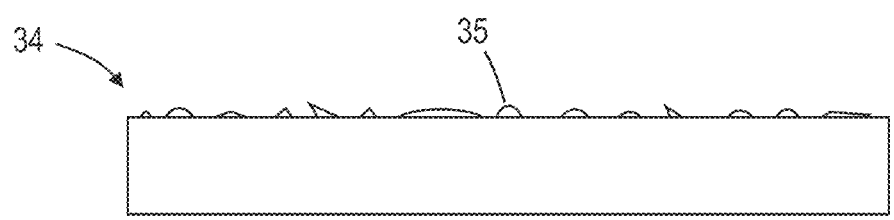
FIG. 10 is a schematic view of an optical surface diffuser of an illustrative integral multilayer optical film.

In some embodiments, the first optical diffuser (30) may include an optical surface diffuser (34), as schematically illustrated in FIG. 10. According to this embodiment, a least a majority of light diffusion occurs at a structured major surface (35) of the optical bulk diffuser.

In some embodiments, the optical construction may include a first prism film (12) and a second prism film (22). The first prism film (12) includes the first structured layer (10) including the first structured major surface having the corresponding two-dimensional array of the first structures (11) disposed on a support layer (13). The second prism film (22) includes the second structured layer (20) including the second structured major surface having the corresponding two-dimensional array of the second structures (21) disposed on a support layer (23).

The substrate layer (70) may be disposed between, the first (30) and second (60) embedded optical diffusers in some embodiments. The substrate layer (70) may be bonded to the first (30) and second (60) embedded optical diffusers using appropriate bonding agents. The substrate (70) can be a structural layer include to improve the strength (e.g., tensile strength) of the overall film. The substrate layer (70) may be diffusive by the addition of particles or phase separated polymers of a refractive index differing from that of the substrate host. Examples would include oxides of silicon, titanium, or zirconium dispersed in polycarbonate (PC), PMMA, or PET to scatter light and improve spatial uniformity. The substrate layer (70) may have a diffuse optical transmittance of less than about 5% at least at the at least one visible wavelength. In some aspects, the substrate layer may have a diffuse optical transmittance of less than about or 4%, or 3%, or 2%, or 1% at least at the at least one visible wavelength. The substrate layer (70) may be an optically substantially clear polymeric substrate layer and may include one or more of a polyester, a polycarbonate, an acrylic, a polyurethane, a polyethylene terephthalate (PET), a polypropylene (PP), a polystyrene (PS), an acrylonitrile butadiene styrene (ABS), and an amorphous polyethylene terephthalate (APET), chosen to minimize absorption, and for desired thermo-mechanical properties.

Figure 4:
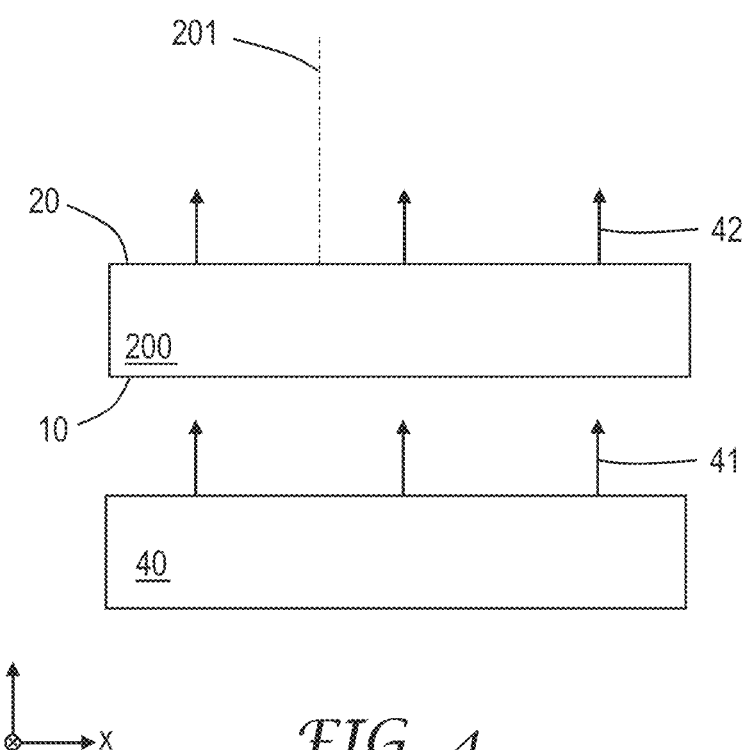
FIG. 4 is a schematic view of an optical construction disposed on a light source.
Figure 5:
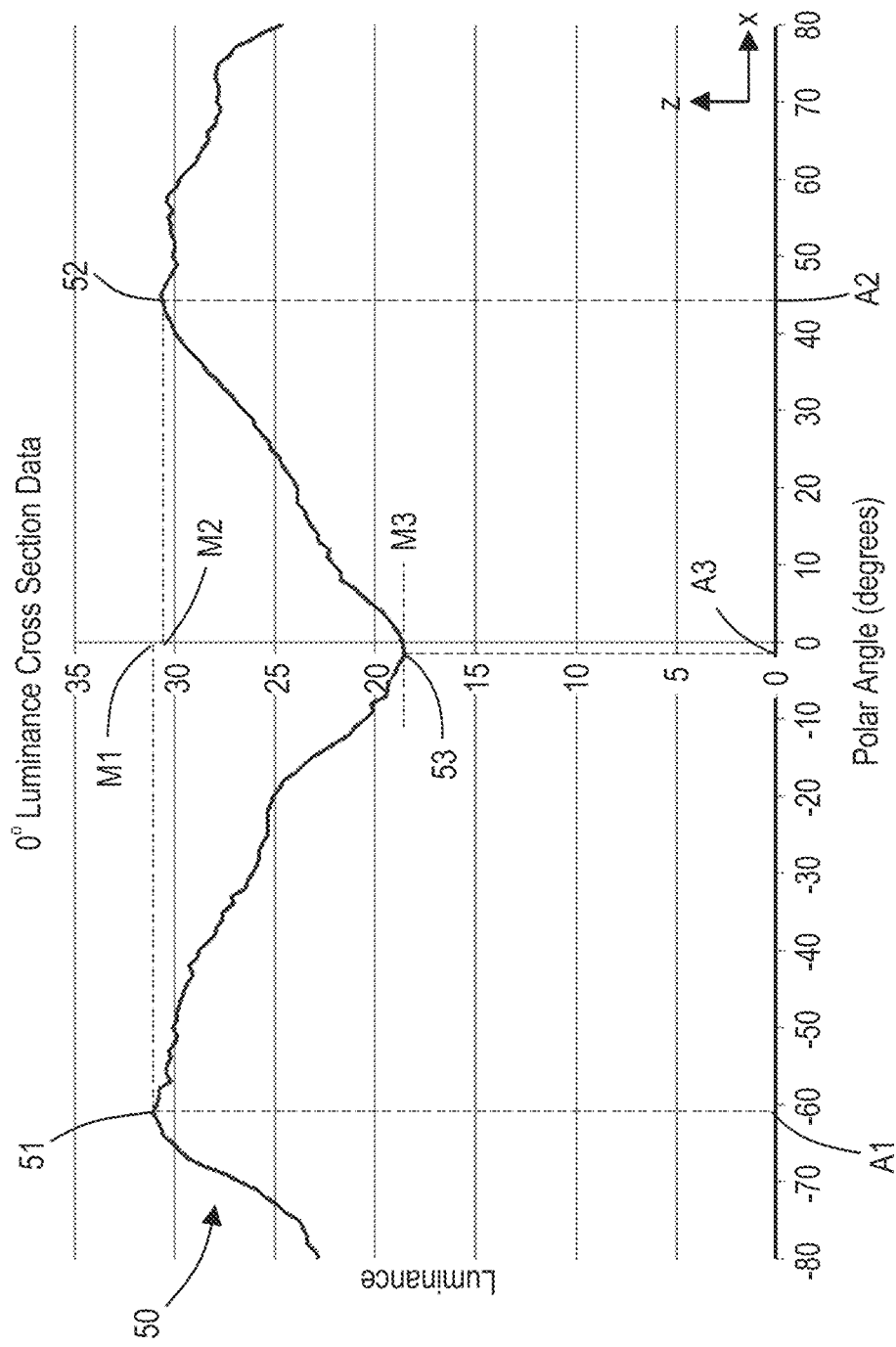
FIG. 5 shows a cross-section of output angle distribution of light transmitted by the illustrative optical construction.

FIG. 5 shows a cross section of the output angle distribution of light when the optical construction (200) is disposed on a light source (40) as shown schematically in FIG. 4. The light (41) emitted by the light source (40) is transmitted by the optical construction (200). In some aspects, the light source (40) may be a substantially Lambertian light source. The structured major surfaces of one of the first (10) and second (20) structured layers faces the light source (40). In the illustrated embodiment, the structured major surface of the first structured layer (10) having the sharper peaks (15) faces the light source (40). In other embodiments, the structured major surface of the second structured layer (20) may face the light source (40). The light angle distribution provides for wide spatial spreading and desired spatial uniformity, while delivering substantial light energy into the acceptance angle of films in the optical construction (200).

In some embodiments, a cross-section of an angular luminous distribution (50) of the transmitted light (42) in at least one first plane (xz-plane) that includes a normal (201, z-axis) to the optical construction includes first (51) and second (52) intensity peaks at respective first (A1) and second (A2) angles on opposite sides of the normal. The first intensity peak (51) may be a global maximum (51) on one of side of the normal (201) and the second intensity peak (52) may be a global maximum (52) on the other side of the normal (201).

In some aspects, in the at least one first plane (xz-plane), the angular luminous distribution (50) of the transmitted light has a global maximum (51, M1) that makes an angle (A1) of greater than about 20 degrees with the normal (201). In some cases, angle (A1) may be greater than 25 degrees, or greater than 30 degrees, or greater than 35 degrees, or greater than 40 degrees, or greater than 45 degrees, or greater than 50 degrees, or greater than 55 degrees, or greater than 60 degrees with the normal (201). In some other cases, the global maximum (51) makes an angle (A1) of less than about 85 degrees with the normal (201). In some other cases, (A1) may be less than about 80 degrees, or less than about 75 degrees, or less than about 70 degrees, or less than about 65 degrees with the normal (201).

In some aspects, in the at least one first plane (xz-plane), the angular luminous distribution (50) of the transmitted light has a global minimum (53, M3) that makes an angle (A3) of less than about 10 degrees with the normal (201). In some cases, angle (A3) may be less than about 8 degrees, or less than about 6 degrees, or less than about 4 degrees, or less than about 3 degrees, or less than about 2.5 degrees, or less than about 2 degrees, or less than about 1.5 degrees, or less than about 1 degrees with the normal (201).

In some aspects, a magnitude of a difference between an intensity (M1) of the global maximum (51) and an intensity (M3) of the global minimum (53) may be greater than about 20%, or 25%, or 30%, or 35%, or 40%.

When the optical construction (200) is illuminated with a light source (40), the optical construction (200) has an average effective transmission T1. Effective transmission refers to the luminous transmittance of substantially normally incident light. The incident light can be understood to be unpolarized light, except where indicated differently. The average effective transmission is the effective transmission determined over, or averaged over, substantially the entire area of the optical film or determined over, or averaged over, an area sufficiently large (e.g., a diameter of at least about 0.5 mm, or at least about 1 mm, or at least about 5 mm) to average out the effects of local nonuniformities (e.g., clustering of particles). The average effective transmission can be determined as the luminous transmittance determined according to ASTM D1003-13. As indicated in the ASTM D1003-13 test standard, the luminous transmittance is transmittance weighted according to the spectral luminous efficiency function V( ) of the 1987 Commission Internationale de l'Éclairage (CIE).

According to some embodiments, when a comparative integral multilayer optical construction that includes substantially a same construction as the integral multilayer optical construction of the present disclosure, except that it does not include the at least the first embedded optical diffuser (30), is illuminated with the light source (40), the comparative optical construction has an average effective transmission T2. In some aspects, the average effective transmission T1 of the optical construction (200) may be greater than the average effective transmission T2 of the comparative optical construction by at least 0.5%. In some other instances, T1 may be greater than T2 by at least 0.75%, or by at least 1%, or by at least 1.25%, or by at least 1.5%, or by at least 1.75%, or by at least 2%.

Figure 6:
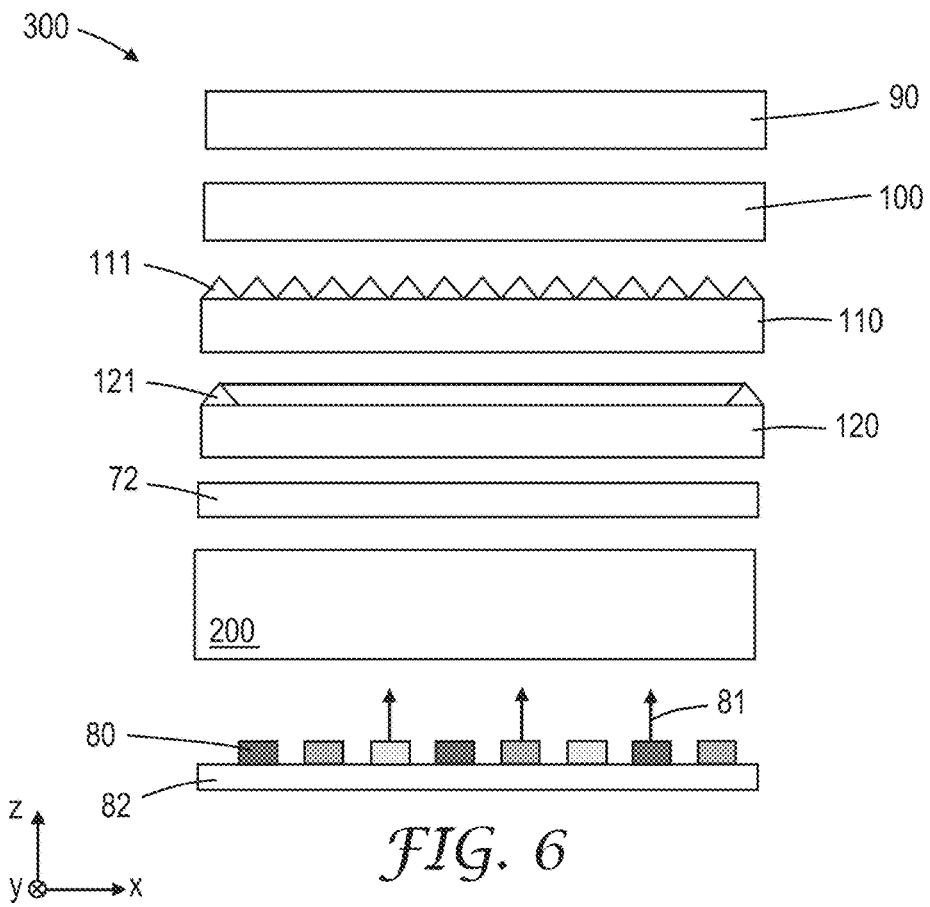
FIG. 6 is a schematic cross-sectional view of a display system including an integral multilayer optical film.

FIG. 6 schematically illustrates a display system (300) including the optical construction (200) according to this disclosure. This display system (300) includes a plurality of light emitting sources (80) configured to emit light (81). The plurality of light emitting sources (80) may include LEDs emitting white light. The plurality of light emitting sources (80) may be disposed on a reflective substrate (82) having an optical reflectance of greater than about 30%, or greater than about 40%, or greater than about 50%, or greater than about 60%, or greater than about 70%, or greater than about 80%, or greater than about 90% at the at least one visible wavelength. A display panel (90) may be disposed on the light emitting sources (80) and may be configured to receive the emitted light (81) and form an image (91).

A reflective polarizer (100) may be disposed between the display panel (90) and the light emitting sources (80). The display panel may be a liquid crystal panel (LCP) in some embodiments. The reflective polarizer (100) may transmit a polarization state useful for the display panel (90), recycling the orthogonal polarization to enhance brightness and uniformity.

Figure 7:
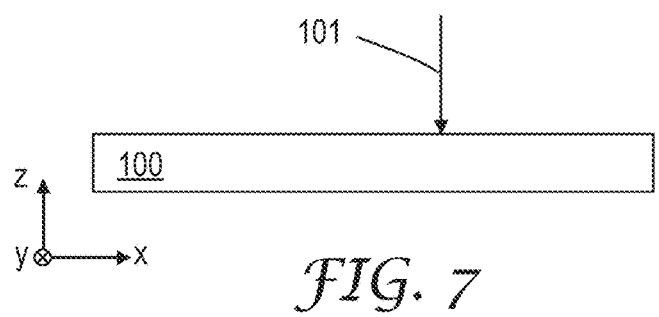
FIG. 7 is a schematic view of light normally incident on a reflective polarizer of an illustrative display system.

In some aspects, as shown in FIG. 7, for a substantially normally incident light (101) and for at least the at least one visible wavelength, the reflective polarizer (100) may reflect at least 60% of the incident light having an in-plane first polarization state (x-axis). In some embodiments, for a substantially normally incident light (101) and for at least the at least one visible wavelength, the reflective polarizer (100) may reflect at least 70%, or at least 80%, or at least 90%, or at least 95% of the incident light having an in-plane first polarization state (x-axis). For a substantially normally incident light (101) and for at least the at least one visible wavelength, the reflective polarizer (100) may transmit at least 60% of the incident light having an orthogonal in-plane second polarization state (y-axis). In some embodiments, for a substantially normally incident light (101) and for at least the at least one visible wavelength, the reflective polarizer (100) may transmit at least 70%, or at least 80%, or at least 90%, or at least 95% of the incident light having an orthogonal in-plane second polarization state (y-axis).

The integral multilayer optical construction (200) of one or more embodiments of the disclosure may be disposed between the reflective polarizer (100) and the light emitting sources (80) as shown in FIG. 6. In some embodiments, the first peaks (15) of the structures (11) of the first structured layer (10) of the integral multilayer optical construction (200) may face the plurality of light emitting sources (80) and the second peaks (25) of the structures (21) of the second structured layer (20) of the integral multilayer optical construction (200) may face away from the plurality of light emitting sources (80). In other embodiments, the second peaks (25) of the structures (21) of the second structured layer (20) may face the plurality of light emitting sources (80) and the first peaks (15) of the first structures (11) of the structured layer (10) faces away from the plurality of light emitting sources (80). The ratio P1/P2 between average pitch (P1) of the first structures (11) and the average pitch (P2) of the second structures (21) may be chosen to at least reduce a visible moire interference of the display system (300).

The integral multilayer optical construction (200) aids in spatially spreading the light (81) in a thin format. In some cases, the integral multilayer optical construction (200) may also recycle light to the reflective substrate (82) to improve uniformity. In some instances, more than one integral multilayer optical construction (200) may be stacked above the light emitting sources (80) to improve uniform illumination in a thin format as desired.

In some embodiments, the first (30) and second (60) optical diffusers having different optical hazes may be arranged with respect to the light emitting sources (80) such that the optical diffuser (30, 60) having the greater optical haze faces the light emitting sources (80).

One or more brightness enhancement films, for example, prismatic films (110, 120), may be disposed between the reflective polarizer (100) and the integral multilayer optical construction (200). The prismatic films (110, 120) may be configured to transmit light in an angle distribution to enhance axial illumination, while recycling a portion to improve uniformity and brightness. The prismatic films (110, 120) can also split the incident images to further enhance uniformity.

In some embodiments a first prismatic film (110) film may be disposed between the reflective polarizer (100) and the integral multilayer optical construction (200). The first prismatic film (110) may include a plurality of linear prismatic structures (111) extending along a longitudinal direction (y-axis) and arranged along an orthogonal lateral direction (x-axis). A second prismatic layer (120) may be disposed between the reflective polarizer (100) and the integral multilayer optical construction (200). As illustrated in FIG. 6, the second prismatic layer (120) may be disposed between the first prismatic layer (110) and the integral multilayer optical construction (200). The second prismatic film (120) may include a plurality of linear prismatic structures (121) extending along a longitudinal direction (x-axis) and arranged along an orthogonal lateral direction (y-axis).

Figure 8:
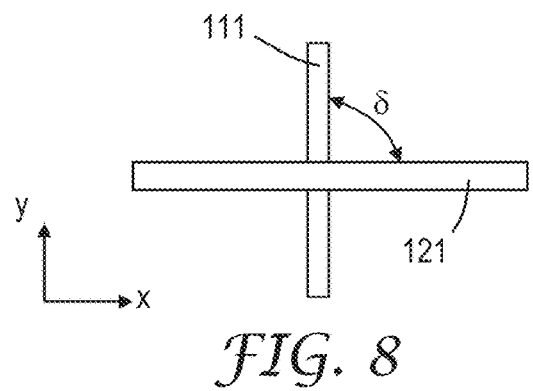
FIG. 8 is a schematic view of an angular orientation between brightness enhancement films of an illustrative display system.

FIG. 8 schematically shows the angle (δ) between the longitudinal direction (y-axis) of the linear prismatic structures (111) of the first prismatic film (110) and the longitudinal direction (x-axis) of the linear prismatic structures (121) of the second prismatic film (120). In some embodiments, the angle (δ) may be greater than about 30 degrees. In some other embodiments, the angle (δ) may be greater than about 40 degrees, or greater than about 50 degrees, or greater than about 60 degrees, or greater than about 70 degrees, or greater than about 80 degrees, or greater than about 85 degrees.

In some aspects a diffuser film (72) may be disposed between the display panel (90) and the light emitting sources (80). For instance, the diffuser film (72) may be disposed between the one or more prismatic films (111, 121) and the integral multilayer optical construction (200) as shown in the embodiment illustrated in FIG. 6. The diffuser film (72) may consist of embedded particles that scatter light or may utilize surface structure or both to further improve spatial uniformity and condition the angle distribution for the upper films to maximize efficiency.

Figure 11:
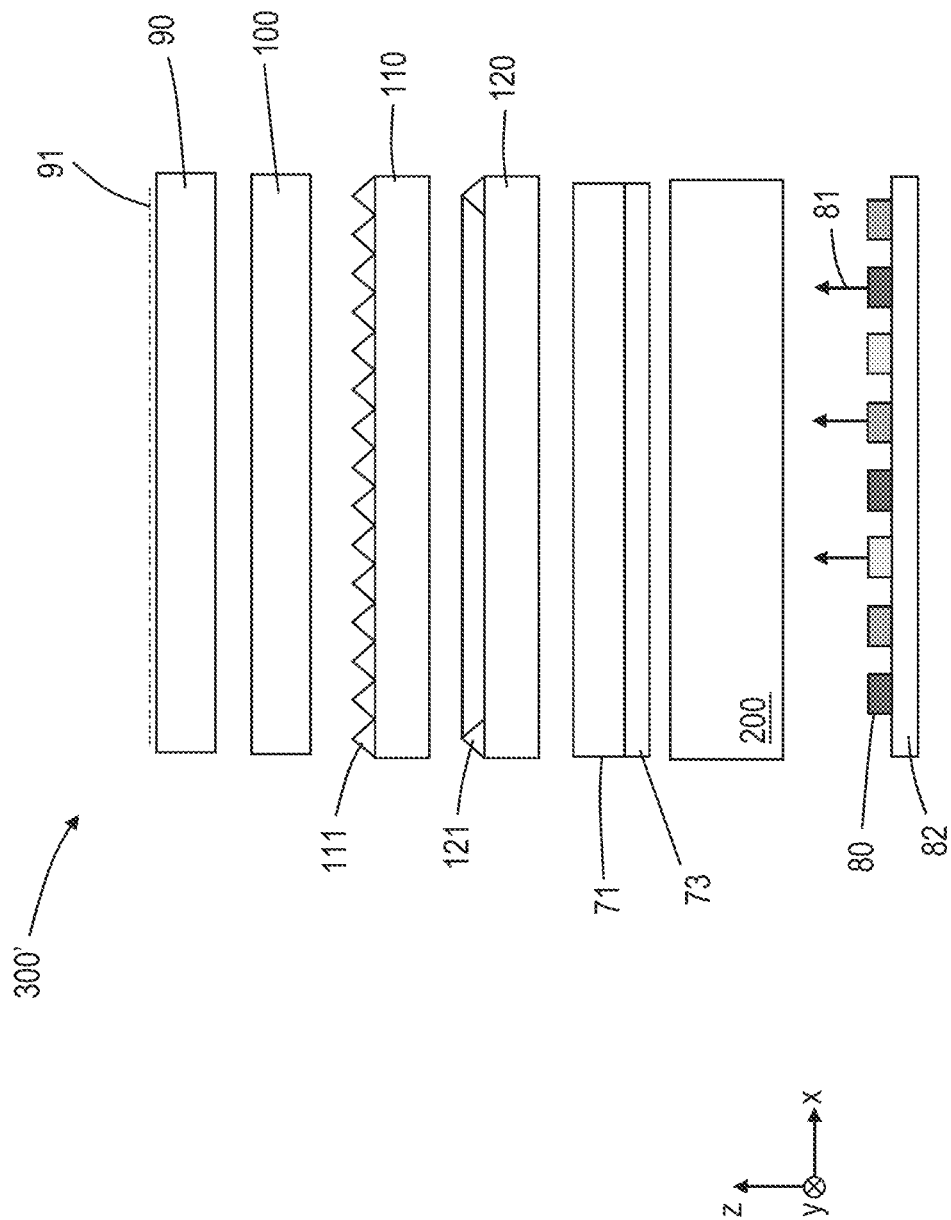
FIG. 11 is a schematic cross-sectional view of a display system including an integral multilayer optical film.

FIG. 11 schematically shows another embodiment of the display system (300') including the integral multilayer optical construction (200) according to one or more embodiments of this disclosure. The display system (300') may include a light converting material (71), also known as wavelength-conversion material, disposed between the display panel (90) and the light emitting sources (80). For instance, the light converting material (71) may be disposed between the one or more prismatic films (111, 121) and the integral multilayer optical construction (200) as shown in the embodiment illustrated in FIG. 11. The light converting material (71) may be configured to receive a first light having a first wavelength and, in response, emit a second light having one or more different second wavelengths. In some cases, the first wavelength may be smaller than the one or more different second wavelengths. For instance, the first wavelength may be less than about 420 nm and the one or more different second wavelengths may be greater than about 420 nm. For example, light emitting sources (80) including LEDs usually emit blue light, and the light conversion material (71) may be configured to convert a portion of the blue light into red and green components. Light converting materials can include photoluminescent substances, fluorescent substances, phosphors, quantum dots, semiconductor-based optical converters, or the like. Light-converting materials also can include rare earth elements.

In some aspects, a transmissive filter layer (73) may be disposed between the light conversion material (71) and the optical construction (200). The transmissive filter layer (73) may be a blue transmissive filter layer that allows blue light to enter the light conversion material (71) and reflects red and green light generated by the light conversion material (71) toward the direction of the display panel, to enhance the efficiency of color conversion. An example of such a transmissive filter layer (73) filter is the 3M Blue Light Transmitting (BLT) film. The BLT film is a multi-layer optical film that transmits blue light over a fixed angle range (+/−θ$_{BLT}$), reflecting and recycling blue light incident at higher angles. The optical construction (200) acts to spread the blue LED light spatially, and ideally maximizes the brightness within the θ$_{BLT}$ range. A portion of the blue, red, and green light is recycled by the prismatic films (110, 120), leading to more color conversion efficiency and improved color and spatial uniformity.

Figure 12:
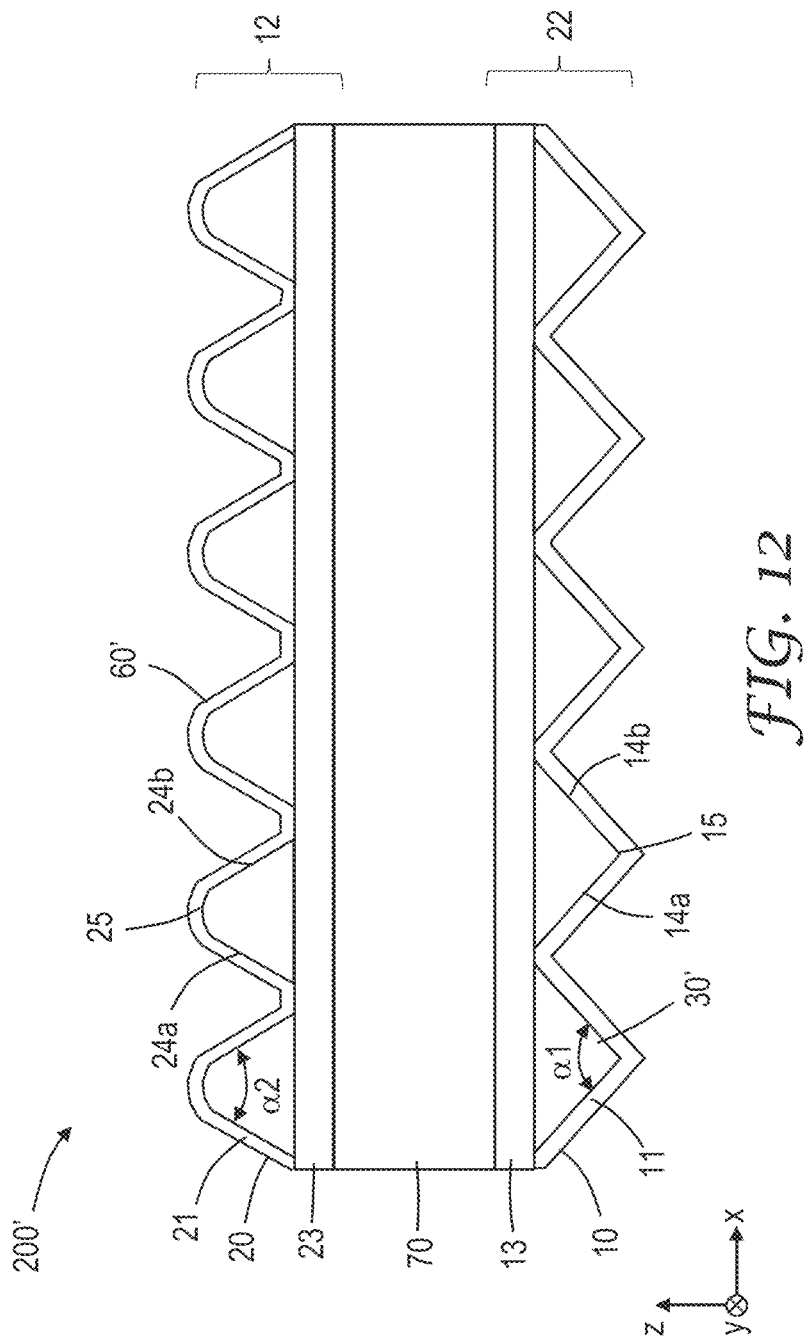
FIG. 12 is a schematic cross-sectional view of illustrative integral multilayer optical films.

Another embodiment of an optical construction (200') is shown in FIG. 12. According to this embodiment, the first optical diffuser (30') may be formed in the structured major surface of the first structured layer (10) so that the structured major surface of the first structured layer (10) includes the first optical diffuser (30'). The second optical diffuser (60') may be formed in the structured major surface of the second structured layer (20) so that the structured major surface of the second structured layer (20) includes the second optical diffuser (60').

In some aspects, the first optical diffuser (30') may be disposed on, and may substantially conform to, the structured major surface of the first structured layer (10) so that the first optical diffuser (30') may have a substantially constant thickness. In some aspects, the thickness of the first optical diffuser (30') can vary by no more than about 40%, or no more than about 35%, or no more than about 30%, or no more than about 25%, or no more than about 20%, or no more than about 15%, or no more than about 10%. The second optical diffuser (60') may be disposed on, and may substantially conform to, the structured major surface of the second structured layer (20) so that the second optical diffuser (60') may have a substantially constant thickness. In some aspects, the thickness of the second optical diffuser (60') can vary by no more than about 40%, or no more than about 35%, or no more than about 30%, or no more than about 25%, or no more than about 20%, or no more than about 15%, or no more than about 10%.

Each of the first (30') and second (60') optical diffusers may have an optical haze of greater than about 2%, or greater than 5%, or greater than 10%, or greater than 15%, or greater than 20%, or greater than 25%, or greater than 30%, or greater than 40%, or greater than 50%, or greater than 60%, or greater than 70%, or greater than 80%, or greater than 90%, or greater than 95% when measured in air for at least one visible wavelength in a visible wavelength range extending from about 420 nm to about 680 nm.

The structured layers (10, 20) and the optical diffusers (30, 60; 30', 60') according to one or more embodiments, can be manufactured by extrusion replication, and UV cured resins, with shapes defined by complementary tooling. Methods to create tooling for the structured layers (10, 20) and the optical diffusers (30, 60; 30', 60')) include diamond turning, electroplating, chemical etching, lithography, engraving, and bead or sand blasting of metal surfaces. For example, a surface diffuser structure may be embossed or extrusion replicated on both sides of a polymer film, then UV cure a resin using a surface tool onto the top surface, and UV cure another resin using a tool on the bottom surface. The embossed substrate surface can scatter light as needed if the resin and substrate refractive index differs by at least 0.01.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

The invention claimed is:

1. An integral multilayer optical construction comprising:
opposing first and second structured major surfaces comprising substantially regular two-dimensional arrays of respective first and second structures arranged thereacross; and
at least a first embedded optical diffuser embedded within the optical construction between, and spaced apart from, the first and second structured major surfaces, the first embedded optical diffuser having an optical haze of greater than about 5% for at least one visible wavelength in a visible wavelength range extending from about 420 nm to about 680 nm,
such that when the optical construction is disposed on a substantially Lambertian light source with one of the first and second structured major surfaces facing the Lambertian light source, light emitted by the Lambertian light source is transmitted by the optical construction with a cross-section of an angular luminous distribution of the transmitted light in at least one first plane that comprises a normal to the optical construction, comprising first and second intensity peaks at respective first and second angles on opposite sides of the normal, wherein the multilayer optical construction has an integral construction;
wherein in the at least one first plane, the angular luminous distribution of the transmitted light has a global maximum that makes an angle of greater than about 20 degrees with the normal and a global minimum that makes an angle of less than about 10 degrees with the normal.

2. The integral multilayer optical construction of claim 1, wherein a magnitude of a difference between an intensity of the global maximum and an intensity of the global minimum is greater than about 20%.

3. The integral multilayer optical construction of claim 1, wherein the global maximum makes an angle of less than about 85 degrees with the normal.

4. The integral multilayer optical construction of claim 1, wherein the first intensity peak is a global maximum on one of side of the normal and the second intensity peak is a global maximum on the other side of the normal.

5. The integral multilayer optical construction of claim 1, wherein the at least the first embedded optical diffuser comprises the first and a second embedded optical diffusers embedded within the optical construction between, and spaced apart from, the first and second structured major surfaces, wherein, the first and second embedded optical diffusers are spaced apart from each other along a thickness direction of the optical construction, and wherein the second embedded optical diffuser has an optical haze of greater than about 2% for at least one visible wavelength in a visible wavelength range extending from about 420 nm to about 680 nm.

6. The integral multilayer optical construction of claim 1, wherein when the optical construction is illuminated with a light source, the optical construction has an average effective transmission T1, and when a comparative integral multilayer optical construction that comprises substantially a same construction except that it does not include the at least the first embedded optical diffuser, is illuminated with the light source, the comparative optical construction has an average effective transmission T2, T1 greater than T2 by at least 0.5%.

7. The integral multilayer optical construction of claim 1, wherein each of the first and second structures comprises at least two facets meeting at a peak of the structure, the peak having a radius of curvature, wherein the radius of curvatures of the peaks of the first structures are different than the radius of curvatures of the peaks of the second structures by at least a factor of 2.

8. A display system comprising:
a plurality of light emitting sources configured to emit light and disposed on a reflective substrate having an optical reflectance of greater than about 30% at at least one visible wavelength;
a display panel disposed on the light emitting sources and configured to receive the emitted light and form an image;
a reflective polarizer disposed between the display panel and the light emitting sources, such that for a substantially normally incident light and for at least the at least one visible wavelength, the reflective polarizer reflects at least 60% of the incident light having an in-plane first polarization state, and transmits at least 60% of the incident light having an orthogonal in-plane second polarization state; and
the integral multilayer optical construction of claim 1 disposed between the reflective polarizer and the light emitting sources.

9. The display system of claim 8 further comprising first and second prismatic films disposed between the reflective polarizer and the integral multilayer optical construction, each of the prismatic films comprising a plurality of linear prismatic structures extending along a longitudinal direction and arranged along an orthogonal lateral direction, such that an angle between the longitudinal directions of the first and second prismatic films is greater than about 30 degrees.

10. The display system of claim 8, wherein the at least the first embedded optical diffuser comprises the first and a second embedded optical diffusers embedded within the optical construction between, and spaced apart from, the first and second structured major surfaces, wherein, the first and second embedded optical diffusers are spaced apart from each other along a thickness direction of the optical construction, and wherein the second embedded optical diffuser has an optical haze of greater than about 2% for at least one visible wavelength in a visible wavelength range extending from about 420 nm to about 680 nm.

11. The display system of claim 8, wherein the first and second structures comprise respective pluralities of first and second peaks, the first peaks sharper than the second peaks, the first peaks facing the plurality of light emitting sources, the second peaks facing away from the plurality of light emitting sources.

12. The integral multilayer optical construction of claim 8, wherein the first structures are arranged along at least a first direction at an average pitch P1 and the second structures are arranged along at least a second direction (x-axis) at an average pitch P2, and wherein $P1/P2 \leq 3$.

13. The integral multilayer optical construction of claim 8, wherein the first structures form parallel rows of first structures extending along a first direction and the second structures form parallel rows of second structures extending along a second direction, and wherein the first and second directions form an angle of greater than about 5 degrees and less than about 85 degrees therebetween.

14. The integral multilayer optical construction of claim 8, wherein the angle between the first and second directions is greater than about 70 degrees and less than about 85 degrees.

15. The integral multilayer optical construction of claim 8 further comprising a light converting material disposed between the opposing first and second structured major surfaces and configured to receive a first light having a first wavelength and, in response, emit a second light having one or more different second wavelengths.

16. The integral multilayer optical construction of claim 15, wherein the first wavelength is less than about 420 nm and the one or more different second wavelengths are greater than about 420 nm.

17. An integral multilayer optical construction comprising:

opposing first and second structured major surfaces comprising substantially regular two-dimensional arrays of respective first and second structures arranged thereacross; and first and a second optical diffusers disposed on, and substantially conforming to, the respective first and second structured major surfaces so that each of the first and second optical diffusers has a substantially constant thickness, wherein each of the first and second optical diffusers has an optical haze of greater than about 2% for at least one visible wavelength in a visible wavelength range extending from about 420 nm to about 680 nm, such that when the optical construction is disposed on a substantially Lambertian light source with one of the first and second structured major surfaces facing the Lambertian light source, light emitted by the Lambertian light source is transmitted by the optical construction with a cross-section of an angular luminous distribution of the transmitted light in at least one first plane that comprises a normal to the optical construction, comprising first and second intensity peaks at respective first and second angles on opposite sides of the normal, wherein the multilayer optical construction has an integral construction;

wherein in the at least one first plane, the angular luminous distribution of the transmitted light has a global maximum that makes an angle of greater than about 20 degrees with the normal and a global minimum that makes an angle of less than about 10 degrees with the normal.

18. The integral multilayer optical construction of claim 17, wherein the thickness of each of the first and second optical diffusers varies by no more than about 40%.

19. The integral multilayer optical construction of claim 17, wherein the first optical diffuser is formed in the first structured major surface so that the first structured major surface comprises the first optical diffuser, and wherein the second optical diffuser is formed in the second structured major surface so that the second structured major surface comprises the second optical diffuser.

* * * * *